United States Patent [19]

Whetstone et al.

[11] 3,904,821
[45] Sept. 9, 1975

[54] POSITION DETERMINATION DEVICES

[75] Inventors: Albert L. Whetstone, Southport, Conn.; Alfred E. Brenner, Glenellyn, Ill.

[73] Assignee: Summagraphics Corporation, Fairfield, Conn.

[22] Filed: Dec. 5, 1973

[21] Appl. No.: 422,049

[52] U.S. Cl. .................................................. 178/19
[51] Int. Cl.² ........................................ G08C 21/00
[58] Field of Search ................. 33/1 M, 1 P, 1 HH; 324/34 MA; 178/18, 19, 20; 340/11

[56] References Cited
UNITED STATES PATENTS

| | | | |
|---|---|---|---|
| 2,401,094 | 5/1946 | Nicholson, Jr. .............. | 324/34 MA |
| 3,806,642 | 4/1974 | Veith et al. ................. | 178/18 |
| 3,808,364 | 4/1974 | Veith .......................... | 178/19 |

*Primary Examiner*—Thomas A. Robinson
*Attorney, Agent, or Firm*—Daniel M. Rosen

[57] ABSTRACT

A coordinate digitizer wherein a field generating device is positioned in proximity to the surface at a location to be digitized. Further means are provided for triggering the production of a magnetic field by the field generating device, the magnetic field transducing a propagating vibrational mode into the transmission media. Pick-up means are coupled to the transmission media and respond to the propagating vibrational mode for providing a signal to a utilizational device which will respond to the means triggering production of the field as well as to the pick-up means in order to provide a position signal corresponding to the time of propagation of the vibrational mode from its time of generation to its time of pick-up. The vibrational mode is effected by means of a strain wave magnetostrictively induced by the magnetic field into the transmission media. The transmission media constitutes a sheet of magnetostrictive material positioned beneath the support surface. The magnetic field generating device is positioned along the coordinate edges of the surface, and the pick-up is a point location in the form of an individual stylus in the shape of a writing implement or a cursor. The field may be energized by means of a series of pulses or by individual pulses as desired.

14 Claims, 8 Drawing Figures

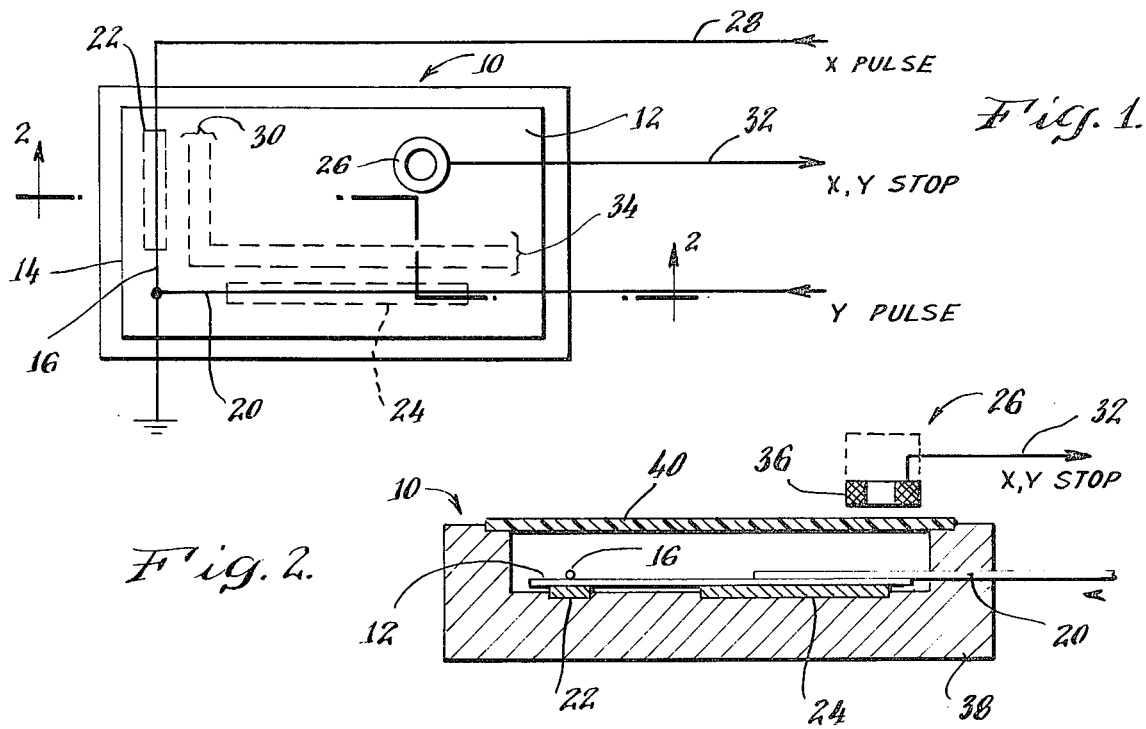
Fig. 1.
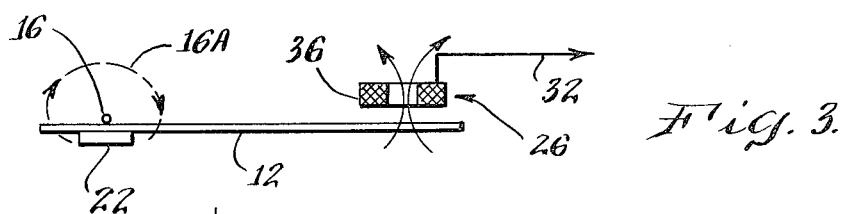
Fig. 2.
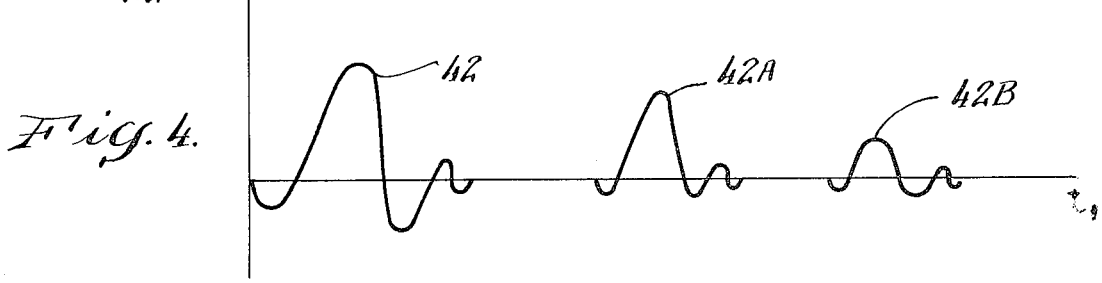
Fig. 3.
Fig. 4.
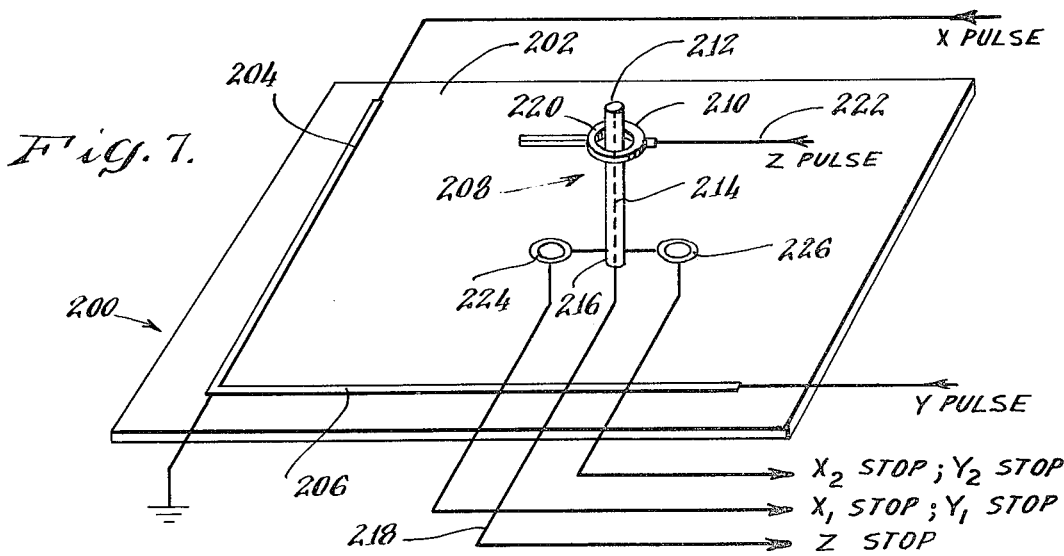
Fig. 7.

POSITION DETERMINATION DEVICES

This invention, relates to position determination devices and, more particularly, to coordinate digitization employing strain wave vibrational mode transmission and reception.

Graphical data devices requiring position location are commonly employed in such areas as facsimile transmission and as computer data input devices. The earlier forms of such devices employed a stylus, or cursor, in the form of a writing implement or pointer device mechanically coupled to a set of arms for translating the movement thereof into a sequence of usable information signals. Such arrangements are unsatisfactory in that they present undesirable frictional and inertial limitations. One variation of the foregoing arrangement employed a sheet resistance material to provide an $x/y$ coordinate designation, but such devices often present linearity, resolution and uniformity problems giving rise to erroneous information, and have been generally unreliable.

In other forms, light pens may provide graphical data but require interaction with cathode ray display devices, and are thus limited in usefulness. One attempt made to overcome the foregoing difficulties has been the employment of a sonic transducing coordinate digitizer requiring some form of acoustic transmission either through the atmosphere or through a surface to a set of receptor devices. The signal source is in the nature of a vibrational or sonic wave generation device. The vibrational device operates conventionally by the use of tuned crystal generation and pick-up devices acoustically coupled through the subsurface of a two dimensional digitizing area. The accuracy of tuning is important in such devices and requires extensive constructional detail and expensive components. The sonic wave generation devices rely upon atmospheric transmission of a sound wave generated at the location determined by the sound source with respect to the sound receivers. Use of atmospheric transmission, however, has proven to give rise to inaccuracies, non-uniformity and loss of resolution as a result of variation in effective ambient conditions. The speed of sound will vary considerably over a temperature range, and it is necessary to provide some means of temperature compensation in order to provide accurate reproduceability of coordinate digitization using an atmospheric transmission system. In addition, the atmospheric transmission system is subject to Doppler effect error and propagation time error due to draft conditions, and to external noise conditions, all resulting in erroneous information. Finally, atmospheric transmission systems require a specific sound source, which often proves objectionable from a noise level view point as well as in providing certain discomfort and inconvenience, particularly in light of the requirement of an audible sound source to be positioned at the tip of a writing stylus handheld by an operator.

Another suggested alternative has been deployment of an array of embedded wires positioned in a data surface or subsurface along $x/y$ coordinates. In the embedded wire system, the stylus provides some means for generating a magnetic field which is picked up in the location corresponding to the closest coordinate intersection of the $x/y$ wire position within the subsurface. The signal thus transduced into the subsurface wire array is picked up by means of a suitable receptor located at the ends of the respective wires and the position of the respective wires thereby digitized. Conventional means for accomplishing the foregoing effect have employed digital logic circuitry responsive to the presence of induced pulses along the appropriate $x/y$ wire lines corresponding to the position of the transduced pulses. This method is extremely expensive to reproduce in order to derive the required resolution. In addition, the wires must be precisely positioned within the array, since error due to a misplaced wire will be significant. Further, the system is not absolute, but rather digitizes only with respect to an initial position. An alternative to the foregoing form employs the use of delay lines terminating the $x/y$ wire array, the time delay required for the pulse induced in an $x/y$ wire to traverse the delay line terminating the respective $x/y$ array wires being digitized and thereby providing a digital coordinate location. The foregoing method, however, also provides certain expense in achieving the required accuracy necessary for the connection of the delay lines to the $x/y$ array wires. In addition, the foregoing method requires extremely accurate placement of the $x/y$ wire array with respect to the delay lines in order to avoid gross inaccuracies in coordinate position. The care that must be taken in assembling such an array gives rise to a high cost as well as complicating accurate reproduction of information with respect to pluralities of such arrays.

One proposed solution is set forth in U.S. Pat. No. 3,846,580, filed Dec. 6, 1972, issued Nov. 5, 1974, and assigned to the assignee of the present invention. In the device disclosed therein, a position determination device is provided with an array of a plurality of transmission media. The transmission media are preferably an array of parallel wires arranged along a horizontal or $x$ axis and a further array of wires arranged along a vertical or $y$ axis. Coordinate location is accomplished by digitizing the time delay required for an induced pulse to traverse the transmission media from a generation point to a reception point. Specifically, a field generating device is positioned in proximity to the surface at a location to be digitized. Further means are provided for triggering the production of a magnetic field by the field generating device, the magnetic field transducing a propagating vibrational mode into the transmission media. Pick-up means are coupled to the transmission media and respond to the propagating vibrational mode for providing a signal to a utilization device which will respond to the means triggering production of the field as well as to the pick-up means in order to provide a position signal corresponding to the time of propagation of the vibrational mode from its time of generation to its time of pick-up. The vibrational mode is effected by means of a strain wave magnetostrictively induced by the magnetic field into the transmission media. The transmission media constitutes a plurality of magnetostrictive wires arrayed along the support surface. The magnetic field generating device may be an individual stylus in the shape of a writing implement of a cursor. The field may be energized by means of a series of pulses or by individual pulses as desired. In further detail, a data digitizer is coupled both to the pick-up and the field generation device for digitizing the time duration between the field generation and the reception by the pick-up device, thus providing a data signal representative of such duration. The duration is actually a measure of the elapsed time required for the strain wave generated to propagate to the pick-up.

The data thus provided may be fed to a computer memory for temporary or permanent storage and will be retrieved when desired. By storing, and later retrieving, the image may be recalled for display on a suitable cathode ray tube or like display device. The data may also be fed directly to a display device by conversion of the digitized signals to analog magnitude and display thereof as a continuous series of signals on the face of the cathode ray tube. The data may also be used to address a ROM and thereby be transferred into any other format. The data may also be transmitted over dedicated or common carrier communications lines.

The foregoing description while providing a novel and unique solution to the problem of position determination gives rise to certain manufacturing difficulties in providing an accurate positioned array of wires arranged in an $x$ and $y$ coordinate. It is therefore desirable to provide an improvement of the magnetostrictive concept described in the above-identified U.S. Pat. No. 3,846,580 which will not sacrifice any of the operational advantages of the device as described therein but, on the other hand, will provide greater ease of manufacture, increased accuracy and reliability, as well as showing an improvement in efficiency and economy.

It is therefore the principal object of the present invention to provide a coordinate digitization device of improved operation and configuration.

It is another object of this invention to provide a graphical data device employing pulse generation and pick up on an absolute coordinate basis.

It is another object of the present invention to substantially eliminate digitizing error in a coordinate digitization array.

It is a further object of the present invention to provide a coordinate data device having improved accuracy and reliability and operating with a degree of economy heretofore unobtainable.

The foregoing objects are realized in a position determination device employing strain wave transmission through a nondirectional transmission media. The transmission media is nondirectional in that it is not a discrete organization of transmission devices but rather a sheet of transmissive material operable in accordance with magnetostrictive principles. Coordinate location is accomplished by digitizing the time delay required for an induced strain wave to transverse the transmission media from a generation point to a reception point. Specifically, a strain wave is magnetostrictively induced as a simultaneous unitary longitudinal line wave across an entire axis of a transmission media from a position in proximity with the edge of the data surface by triggering the production of a magnetic field through a field generating device, the magnetic field inducing the strain wave in a propagating vibrational mode into the transmission media. Pick up means are coupled to the transmission media and respond to the propagating vibrational mode for providing a signal to a utilization device which will respond to the means triggering production of the field as well as to the pick up means in order to provide a position signal corresponding to the time of propagation of the vibrational mode from its time of generation to its time of pick up. The transmission media, constituting a sheet of magnetostrictive material, transmits the longitudinal wave form induced along the edges thereof as a line wave moving in a direction orthogonal with respect to the transmission generation device along the magnetostrictive sheet. The pick up device may be an individual stylus in the shape of a writing implement or a cursor. The field is energized by means of a series of pulses or by individual pulses as may be desired. Multiple coordinates are provided by multiple field generating devices located along various coordinate axes of the data defining surface.

In further detail, a data digitizer is coupled both to the pickup and to the field generating device for digitizing the time duration between the field generation and the reception by the pick-up device, thus providing a data signal representative of such duration. The duration is actually a measure of the elapsed time required for the propagating strain wave to traverse the distance from the field generating device to the pick-up means. As many data digitizers may be provided as coordinate axes exist to be digitized. In a two-dimensional device, two coordinate axes may be provided to provide $x$ and $y$ coordinates. A three-dimensional embodiment may also be provided by adding a digitizing $z$ axis.

The data thus provided may be fed to a computer memory for temporary or permanent storage and retrieved when desired. By storing and later retrieving, the image may be recalled for display on a suitable cathode ray tube or like display device. The data may also be fed directly to a display device by conversion of the digitized signals to analog magnitude and display thereof as a continuous series of signals on the face of the cathode ray tube. The data may also be used to address a read only memory and thereby be transferred into any other format. The data may also be transmitted over dedicated or common carrier communication lines.

The foregoing objects and brief description as well as further objects, features and advantages of the present invention will become more apparent from the following description with reference to the appended drawings wherein:

FIG. 1 is a schematic array of the present invention illustrating the relationship between the field generating and pick-up devices.

FIG. 2 is a cross sectional view illustrating the pickup, surface and subsurface formation utilized in conjunction with a field generation.

FIG. 3 is a detail of the relationship between the field generation and the pickup.

FIG. 4 is a waveform diagram illustrating the timing of the planar strain wave.

FIG. 7 is a schematic diagram of a three-dimensional digitizer utilizing the present invention.

Figure 5:
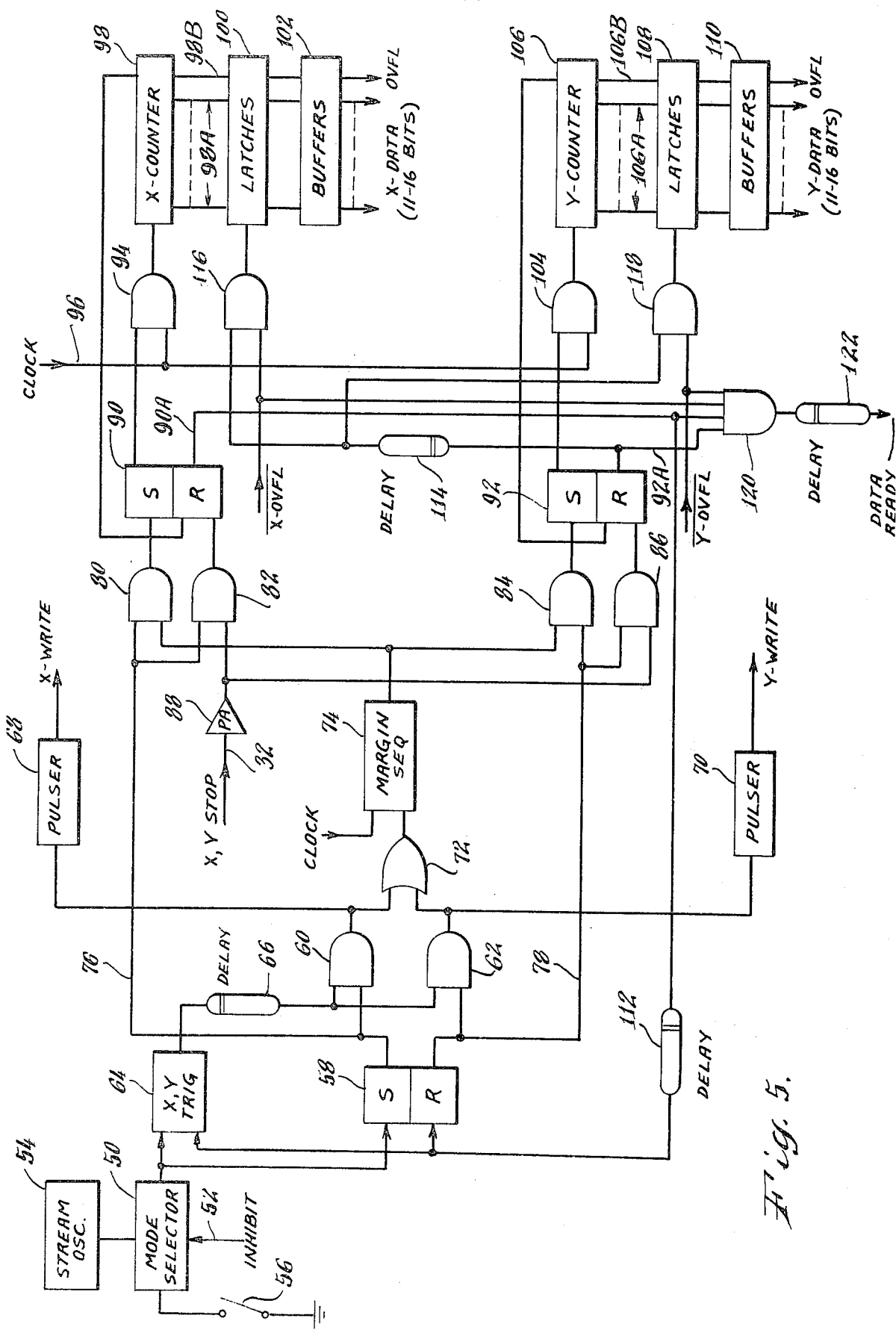
FIG. 5 is a schematic diagram of the data implementation for utilization of the present invention.

The operation of the present invention devolves about the employment of a vibrational mode of longitudinal line strain wave propagation. The specific implementation is by means of a magnetostrictive pulse induced into a non-directional transmission media in the form of a magnetostrictive sheet positioned as a data surface in an $x/y$ coordinate pattern. The sheet will actually be positioned slightly below the plane of the data surface, but for purposes of this description, data surface shall mean the area which is operative for digitizing. Thus, referring now to FIG. 1, a surface illustrated generally as 10 is provided with a magnetostrictive sheet 12. Positioned along the left hand edge 14 of the surface 10 is a vertically oriented wire 16, forming a first line field generating device, while along the bottom portion of the surface 10 is a horizontal wire 20, forming a second line field generating device. The wires 16 and 20 are commonly terminated at a common reference point or ground.

The magnetostrictive sheet 12 is typically of a composition which exhibits magnetostrictive properties. One example of such composition is a nickel iron alloy (48% Ni, 52% Fe) such as is manufactured under the trademark "Shield 80" manufactured by Magnetic Metals of Camden, N.J.

The field generating devices 16 and 20 may be ordinary conductors such as copper wire or other suitable conductive material. Although a single line is shown, the conductors may be positioned as multiple turns to increase the magnetic coupling between the wires and the magnetostrictive sheet 12. In addition, although illustrated as single line discrete conductors, the field generating devices 16 and 20 may obviously be printed conductors or otherwise deposited conductors in accordance with known technology, and may include more than one turn around the sheet.

Beneath each of the respective field generating device wires 16 and 20 is positioned a permanent bias magnet, designated 22 and 24 respectively. The bias magnets, although not essential to the concept of the present invention, as will become more apparent from the more detailed description below, are preferred. These magnets may constitute strip magnetic material of any conventional form such as a ceramic ferrite and the like.

Positioned on the data surface is a pick-up device 26. In accordance with the operation of data tablets performing digitization functions, the position of the pick-up device 26 determines the $x$ and $y$ coordinates of a specified data point in accordance with the time duration required for the vibrational mode strain wave to propagate from the line field generating devices 16 and 20. The operation of the device utilizes a digitization of the time period required for propagation of the field generated through the magnetostrictive sheet 12. Thus, an $x$ coordinate pulse is provided along a suitable input line 28 through the field line 16. As a result of the magnetostrictively induced strain wave resulting in the magnetostrictive sheet material 12, a longitudinal line strain wave propagates simultaneously from the field generating line 16 in a direction orthogonal to the line 16 and across the data surface 10 in a horizontal direction corresponding to the $x$ coordinate. The strain wave 30 is illustrated as a dotted line propagating away from the field generating line 16 towards the pick-up device 26. The vibrational propagation from generation of the strain wave 30 continues through the magnetostrictive sheet 12 until the pick-up 26 is reached. The time of propagation corresponds to the duration which will be digitized to provide the $x$ coordinate digitization by the provision of an appropriate output pulse along pick-up output line 32.

Similarly, when the $y$ coordinate axis pulse is desired, the y pulse is provided along the $y$ axis line corresponding to the field generating line 20. As a result, a corresponding longitudinal line strain wave 34 is generated along a line paralleling the field generating line 20 and moving in a direction orthogonal to the field generating line 20, corresponding to a $y$ axis direction movement. The propagation time of the $y$ axis strain wave 34 along the $y$ axis to the pick-up device provides a corresponding indication of the $y$ axis digitization by the provision of an appropriate output pulse along the pick-up output line 32.

The construction of the data surface is illustrated in greater detail in FIG. 2 showing a cross section taken along the lines 2 — 2 of the device illustrated in FIG. 1. The field pick-up device illustrated as element 26 in FIG. 2 includes a coil 36 positioned at or near the edge of the device 26 in proximity to the upper portion of the data surface 10. The field pick-up device 26 may be a stylus in the form of a marker or other pen type of device, or may be in the form of a rounded cursor, movable about the surface 10. The field pick-up device coil is preferably toroidal, and composed of conventional conductive wire such as copper or the like. For purposes of increasing the intensity of the pick-up signal, the core of the device 26 may be constructed of a ferrite magnetic material and the wire wound with a plurality of turns about such core.

The surface 10 as shown in FIG. 2 is constructed of a base 38 which may be a block of insulating or metallic material, the metallic material being copper, aluminum or the like. The ceramic permanent magnets 22 and 24 are placed directly on the inner portion of the surface of the block 38 as shown. Although shown underneath the field lines 16 and 20, the magnets 22 and 24 may also be arranged to overlie the lines 16 and 20 as well. The magnetostrictive sheet 12 overlays the permanent magnets 22 and 24 and may be affixed to the surface of the block 38 by adhesively securing the edges of the magnetostrictive sheet 12 along its perimeter over an area outside the interior of the sheet comprising the actual data sensitive area, the latter area being that within the area encompassed by the field generating lines 16 and 20. The field generating lines 16 and 20 are positioned so as to overlay the magnets 22 and 24 and pass through the side wall of the block 38 to the exterior data pulsing circuitry. The sides of the block are upraised so as to support an upper surface 40. This upper surface may be a suitable plastic material such as Mylar or the like and which forms a data support surface for supporting material to be digitized or to otherwise form a solid surface across the top of the block 38 for providing a smooth surface upon which the data source material may be placed for interaction with the field generating and pick-up devices as described above.

The overlaying member 40 may be positioned so as to lie above the sheet by virtue of its own tension, or the space between the upper sheet 40 and the interior of the block 38 may be filled with fluid or other non-adhering or non-damping substance. The contacts to magnetostrictive sheet 12 should be kept at a minimum to prevent any undue damping of the longitudinal strain waves provided by the field generating devices.

Referring now to FIG. 3, the operative principle of the invention is illustrated in greater detail. As was noted above, the operative principle in the present invention utilizes a longitudinal vibration mode of strain wave propagation. The energizing field generation which is provided by the generation of a pulse through the line 16 results in the induction of a magnetostrictive disturbance into the magnetostrictive sheet 12 in a manner so as to create a strain wave propagated as a longitudinal line wave in a direction orthogonal to the axis of the respective generating lines in this example, line 16. The nature of the magnetostrictive disturbance in line 16 will be to set up a strain wave, manifested as a vibration in the longitudinal mode along the axis of the sheet 12 as a result of the magnetic field illustrated with the lines 16A. The intensity of the magnetic field is increased by the use of the permanent magnet 22 and it has been found that the use of the permanent magnet 22 increases the signal to noise ratio by increasing the amplitude of the longitudinal strain wave established by means of pulsing the line 16.

The magnetostrictive pulse induced strain wave corresponding to the magnetostrictive vibration induced into the sheet travels along the sheet surface as a line wave in the direction orthogonal to the line 16 at the speed of sound in metal, a factor determined in proportion to the square root of the ratio of Young's modulus to the density of sheet material. In a typical nickel iron composition alloy such as the material described above, the velocity of such may nominally be set at 5,000 meters per second. It should be noted the only criteria required of the transmission medium is that the wave be fast enough to provide the requisite resolution desired in the digitization process, and slow enough to enable a significant count level to be achieved in digitizing the time delay.

The longitudinal mode vibration thus travels down along the sheet 12 until it reaches the area of the pick-up device 26. The strain propagated in the sheet causes a change in permeability which results in a changed flux, thereby inducing the voltage in the pick-up 26, or more specifically the pick-up coil 36, which is transmitted as an electrical pulse along the line 32 to appropriate circuitry contained in the digitization logic.

Thus, it should be noted that the use of a permanent bias magnet 22, by increasing the flux density about the wire 16, increases the signal magnitude induced magnetostrictively into the sheet 12. It will be appreciated, however, that the magnet 22 is not essential and that the magnetostrictive sheet may be premagnetized to a remanant condition necessary to establish the signal level desired. Alternatively, the pick-up circuitry may be made sufficiently sensitive to discriminate between lower signal to noise ratios.

Referring now to FIG. 4, the nature of the pulse induced into the magnetostrictive sheet is illustrated in greater detail. As shown, the strain wave of the pulse induced magnetostrictively into the sheet 12 produces a characteristic wave form. The vibrational wave form 42 produced by the strain resulting from the pulse induced into the magnetostrictive sheet 12 induces a corresponding electrical equivalent into the pickup 26 corresponding to the wave 42, shown in FIG. 4. It is the nature of the magnetostrictive sheet to respond in a manner producing reflections illustrated as 42A and 42B corresponding to the vibrational return caused when the wave strikes the end of the magnetostrictive sheet. The secondary wave 42A is a reflection with diminished amplitude. Wave 42B, representing a third level reflection, has a correspondingly diminished wave form and so on. The nature of the device is to require damping of reflections prior to inducement of the next subsequent data point. Thus, a time will be established corresponding to $t1$ as shown in FIG. 4 which has been determined to be the time required for all reflections generated by a magnetostrictive pulse produced strain wave to damp out completely. It has been found that the time period required is relatively small when compared to the rate of digitization required to perform with satisfactory resolution in a typical data digitizing requirement. It has also been found that by placing the data generation line close to the edge of the magnetostrictive sheet, the first level of reflection at that same edge of the sheet will serve to further increase the amplitude of the signal generated in that the primary signal transmitted down the line will include the initial pulse generated along with a substantial reinforcing contributory effect from the first reflected pulse which will only be slightly displaced therefrom in accordance with the minimal distance of the data generating device from the edge of the sheet. Thus, referring to FIG. 3, if the data line 16 were placed relatively close to the edge of the sheet 12 in reference to the width of the pulse characteristic 42 generated by pulsing of the line 16, the ultimate magnitude of the pulse 42 will be that much higher in that it will be increased by its own reflection. This technique thus serves to increase the signal to noise level ratio and thereby permits simplification of the logic as by reduction of the amount of amplifier sensitivity necessary to distinguish a signal from a noise. In addition, such a technique allows the use of longer transmission areas and thus increased digitization areas.

The signal transduced by the pick-up device 26 may be detected by sensing the leading edge of the rising pulse crossing a predetermined threshold magnitude, in accordance with well-known electronic sensing techniques.

The accuracy of the arrangement illustrated in FIG. 1 represents a distinctive advantage. There is no necessity for an array of digitizing wires placed in an $x/y$ coordinate as is conventional with prior art techniques. The only necessity is that the data generating line 16 and 20 be set so that the longitudinal line strain waves 30 and 34 generated along the $x$ and $y$ coordinates respectively are properly aligned. This may be quickly and easily as well as conveniently and economically accomplished merely by positioning the line 16 such that movement of the pick-up 20 along a line corresponding to an edge of the data surface provides a digitization of equal value, thus defining a locus of points paralleling the line 16. A similar technique may be used to position the line 20 by finding a common digitization point defining a locus of points paralleling the line 20. Thus, accuracy of the system is thereby insured and may be checked from time to time. It may also be possible to set up a means whereby the lines of 16 and 20 may be rotatably mounted so as to vary their relative positions to true vertical and true horizontal or, in fact, to any other desired reference in accordance with the invention and thereby maintain accuracy to a high degree.

Referring now to FIG. 5, the utilization of the present invention in conjunction with suitable circuitry is illustrated in schematic form. The logic circuitry possesses the capability to operate the data digitization in a variety of modes. Thus it may be desirable to operate on a point by point basis digitizing each point either with the cursor or with a stylus onto the data surface. It alternatively may be desirable to continuously encode as the cursor or stylus is movable about the surface. In either event, a mode selector 50 is illustrated with the appropriate external controls (not shown) for selecting either single bit of multiple bit data digitization as desired. A logic inhibit input line 52 is provided to the mode selector to prevent the mode selector from operating under certain conditions which will be described in further detail below. Coupled to the mode selector is a source of data pulses 54 which may be provided from a suitable stream oscillator or pulse generating device. The stylus or cursor is itself provided with a switch 56 which may be used by the operator either to signal proximity with the data surface or to otherwise energize the mode selector for providing the oscillations indicating generation of pulse at a desired moment of data digitization. The pulse thus provided from the mode selector 50 is coupled to a triggerable flip flop 58 and thence to a first and second AND gate set 60 and 62. The output of the mode selector 50 is also coupled to an $x, y$ trigger in the form of a mono-stable multi-vibrator or one shot 64, and, in turn, to a delay 66 which is coupled in turn to the other input of the AND gate set 60 and 62.

The outputs of the gates 60 and 62 are coupled to respective $x$ and $y$ pulsers 68 and 70, for providing the $x$ and $y$ write pulses to the field generating lines 16 and 20 as shown in FIG. 1. These outputs are also connected to the input of an OR gate 72 which, in turn, couples the outputs of the gates 60 and 62 to a margin sequencing device or circuit 74. Depending upon the activation of the triggerable flip flop 58, a suitable energization has been provided along the $x$ permit line 76 or the $y$ permit line 78 for energizing either of the gates 80, 82, 84 or 86 in accordance with the output of the margin sequence circuit 74. Depending upon that activation, a $x/y$ stop signal detected by the cursor 26 will pass along the lines 32 to the preamplifier 88 and be coupled to alternative inputs of either of the gates 82 or 86 for triggering triggerable flip flops 90 or 92 respectively.

The output of the triggerable flip flop 90 is coupled through a logical AND gate 94 in conjunction with a clock pulse, from clock source line 96, to an $x$ counter 98. The output of the $x$ counter is coupled along line 98A through a set of latches 100 to a series of buffers 102 for presenting the $x$ axis data in machine usable form, either serially or parallel by bit. The output of the triggerable flip flop 92 is coupled through the gate 104 in conjunction with the clock pulses provided along the line 96 to the $y$ counter 106 which is in turn coupled along line 106A through a set of latches 108 to a series of buffers 110 for presenting the $y$ axis digitization data in machine usable form.

The output of the triggerable flip flop 90 is coupled along line 90A through a further delay 112 to the reset input of the triggerable flip flop 58 and the one shot circuit 64. The output of the triggerable flip flop 92 is connected along line 92A through a further time delay circuit 114 and through first and second gates 116 and 118 for providing the transfer signal to the latches 100 and 108 respectively for transferring the $x$ and $y$ data through to the appropriate buffers 106 and 110.

The operation of the circuit in FIG. 5 will now be set forth in further detail. As will be noted in conjunction with the description of FIG. 1, it is necessary for the $x$ and $y$ longitudinal line wave form to be each generated sequentially. Thus, the activation of the stylus or control switch of the cursor 56 operates to trigger the mode selection to provide a data pulse from the mode selector 50 to the $x/y$ trigger one shot 64 and the triggerable flip flop 58. The action of this pulse is to set the triggerable flip flop 58 to the gate 60. The gate 60 will become conditioned upon receipt of the delayed one shot pulse 64 through the delay 66, thereby passing a pulse through the AND gate 60 to the OR gate 72. Passage of the pulse from the output of the gate 60 will activate the pulser 68, thereby resulting in a line activation pulse being provided along the field generation line 16, as shown in FIG. 1. Thus, the digitization sequence along the $x$ axis is begun.

The output of the gate 60 also passes into the gate 72, thereby activating the margin sequencer 74. The output of the triggerable flip flop 58 in providing a pulse along the line 76, primes the gates 80 and 82. As soon as a sufficient time period has gone by, defining the margin sequence timing set into the margin sequencer 74, the margin sequencer 74 passes a pulse through the AND gate which has previously been primed by the output of the triggerable flip flop 58 along the line 76. The resulting output of the AND gate 80 thereby sets a triggerable flip flop 90, providing an output pulse setting the AND gate 94. The clock signals provided along the line 96 thus pass the gate 94 and the X-counter 98 begins the $x$-counting digitization corresponding to the propagation of the magnetostrictively induced pulse along the $x$ axis set up by the pulser 68. When the cursor 26 receives the $x$ pulse and transduces an electrical pulse corresponding to the strainwave vibration of the sheet, an electrical pulse is provided along the $x$-$y$ stop line 32 through the pre-amplifier 88 to the gate 82 which has previously been primed by the pulse along line 76. As a result, the output pulse of the gate 82 serves to reset the triggerable flip flop 90, causing the gate 94 to lose coincidence, and thereby resulting in the $x$-counter ceasing its counting action.

At the same time, the reset output pulse appearing from the output of the triggerable flip flop 90 along the line 90A is passed along the delay unit 112 to the one shot 64 and the triggerable flip flop 58. The delay period of the delay unit 112 is sufficient to allow for the reflections resulting from the inducement of a pulse in the magnetostrictive sheet to damp out, in the manner described in connection with FIG. 4 above. Appearance of the output pulse from the delay 112 at the input of the triggerable flip flop 58 resets the flip flop 58 causing the output of the reset side of the flip flop 58 to activate the gate 62 while deactivating the gate 60. Activation of the gate 62 gives rise to an output pulse therefrom triggering the pulser 70 thereby setting up a $y$-pulse along the line 20 in the manner as described above in connection with the $x$-digitization. At the same time, the output pulse from the triggerable flip flop 58 proceeds along the line 78 to prime the gates 84 and 86. Upon passage of the pulse through the OR gate 72 from the AND gate 62, thereby activating the margin sequence circuitry for the properly definable margins, the gate 84 becomes activated thereby triggering the triggerable flip flop 92, causing the set output thereof to prime AND gate 104. The other input of the AND gate 104 thus receives the sequential signals along the clockline 96, thereby permitting the $y$-counter to begin its digitization.

When the induced strain-wave along the $y$-axis 34 (FIG. 1) reaches the pick-up 26, a $y$-stop signal is applied along the line 32 through the pre-amplifier 88 to the input of the gate 86. As a result, the signal passed through the gate 86 resets the triggerable flip flop 92 thereby rendering the set output of the triggerable flip flop 92 low and disabling the gate 104, thereby resulting in a cessation of digitization in the y-counter 106. The reset lines 90A and 92A of the triggerable flip flops 90 and 92 now both being low, and there being no x overflow or y overflow conditions appearing in the x or y counter, the AND gate 120 is thereby activated to provide a data ready signal indicating that the x and y counters have both received their maximum digitization. The data ready signal traverses a delay line 122 which has sufficient delay to enable the signals to be transferred from the x and y counters 98 and 106 through the latches 100 and 108 to the buffers 102 and 110 wherein a data ready signal will enable a data reception unit (not shown) to retrieve the signals from the buffers.

A signal transfer occurs by the provision of an output signal along the line 92A indicating completion of the y-digitization passing through a delay 114 and thus activating AND gates 116 and 118. If no x or y overflow signals ($\overline{X\text{-}OVFL}$, $\overline{Y\text{-}OVFL}$) have occurred as a result of overrunning of the counters 98 and 106, the AND gates 116 and 118 pass an appropriate transfer signal to their respective latches 100 and 108, thereby resulting in a transfer of their respective x and y counters 98 and 106 to the buffers 102 and 110 respectively.

If an overflow condition has occurred, an output signal appears along the overflow lines 98B, referring to the x counter 98, or 106B, referring to the y counter 106. The presence of an overflow condition will prevent the appearance of a data ready signal or a transfer of data from x and y counters to the appropriate buffers, and suitable indication on the digitizer control as by means of an audible or visible signal, or both, may be provided. The completion of the transfer of data through the latches and buffers into data utilization device by application of a data ready signal also signals the system to initiate its next digitization sequence, thereby repeating the foregoing operation.

Figure 6:
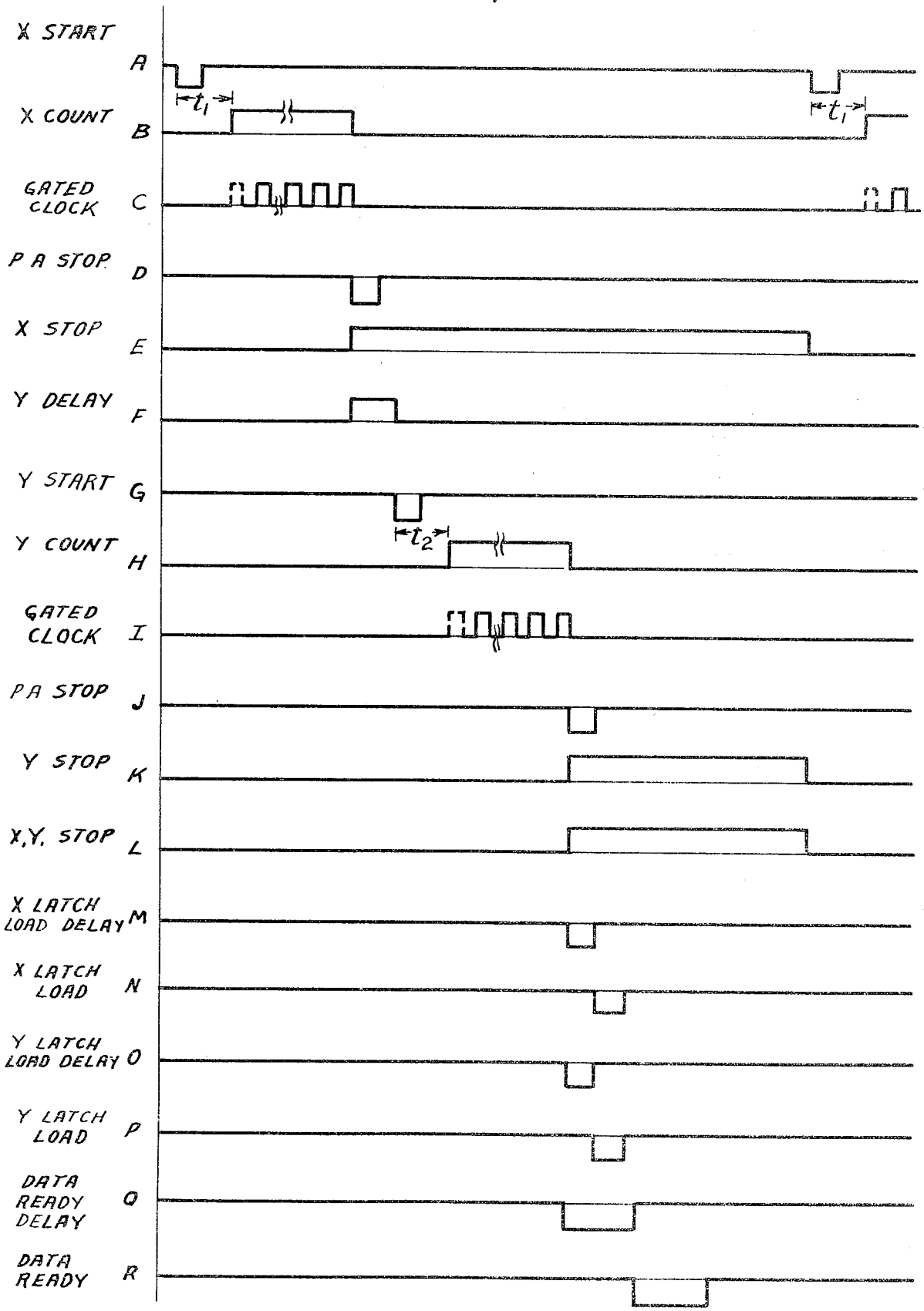
FIG. 6 is a waveform diagram illustrating the operation of FIG. 5.

Referring to FIG. 6, a timing and waveform diagram illustrative of the relative relationships of the digitization of an X and Y coordinate is illustrated. As shown in FIG. 6, the X start pulse is provided along axis A and corresponds to the appearance of a pulse through the pulser 68. The X count pulse along axis B begins after a delay, indicated by timing arrow $t_1$ corresponding to the delay built into the margin sequencer 74. Activation of the X count cycle, representing the setting of the triggered flip-flop 90 permits gated clock signals as shown along axis C and appearing along line 96 to accumulate in the X counter. The appearance of a stop signal into the pre-amplifier 98 is shown on axis D as a short duration pulse. As a result of the short duration pre-amplifier stop signal, the X stop logic signal as shown along axis E appears as the output of the triggerable flip-flop 90. At this time, the resetting of the triggerable flip-flop 90 passes along the line 90A through the delay 112, the delay 112 providing a Y delay shown along the axis F. The end of the Y delay, the Y start pulse shown along axis G is generated through the pulser 70. The delay period indicated by timing arrow $t_2$ also provided by the margin sequencer 74 then opens the triggerable flip-flop 92 to permit the Y count sequence shown on axis H to pass the gated clock signal shown on axis I along the line 96 through to the Y counter. The appearance of the stop signal into the pre-amplifier 88 results in the short duration pulse shown along the axis J. As a result, a Y stop signal indicated along the axis K is generated for effecting the cessation of the count. On resetting of the triggerable flip-flop 92 giving rise to the Y stop duration pulse along the axis K, the signal passing through the delay 114 sets both the X latch loading and Y latch loading cycles. The X, Y stop signal is shown on axis L. The X latch load delay is shown along axis M. Upon termination of the X latch load delay, the X latch load signal appears (axis N) as the input signal to the gate 116 to allow transfer of the data from the X counter to the X buffer representing the X digitization. Similarly, the Y latch load delay appearing along the axis O results in the Y latch load signal appearing along the axis P, representing a signal appearing at the input of gate 118, which results in transfer of the Y digitization from the Y counter 106 to the buffer 110. Simultaneously, the appearance of the reset signal along the line 92A from the triggerable flip-flop 92 has been applied to the gate 120 and held in the data ready delay 122 for a time period evidenced in axis Q as being sufficient to encompass both the X and Y latch loading cycles. At the end of the data ready delay, a data ready signal as shown along the axis R indicates to the external machine utilization device that data has now been loaded in the X and Y buffers and is ready for usage.

Referring to FIG. 7, an embodiment illustrating the manner wherein a three-dimensional digitization may be effected is shown. A tablet data surface 200 is provided with a magnetostrictive sheet 202 and X and Y field transmitting lines 204 and 206 respectively. Biasing magnets may also be present proximate the field lines in the manner described in conjunction with FIG. 1, but are not shown in this figure for ease of illustration. The X and Y digitizations occur in precisely the manner as described above. The three-dimensional aspect is provided by means of a device for indicating the height of a specific point, thus providing a Z axis direction above the surface of the sheet. To this end, a device for digitizing height 208 is shown as including a vertically adjustable pointer 210 mounted on a central shaft 212. The pointer 210 is raisable and lowerable on the shaft 212 in accordance with the particular data point of an object whose height is being measured. The height of the object is determined by means of a magnetostrictive wire 214 which traverses the length of the central shaft 212. At the base of the shaft 212 is a pickup coil 216 and an exit wire 218. The adjustable mechanism incorporating pointer 210 includes a field generating coil 220, coupled to a Z pulse input line.

In operation, the pointer 210 is adjusted vertically along the length of the shaft 212 to provide a height in accordance with the height of an object at the tip of the pointer 210. Digitization occurs by the provision of a digitizing pulse along the Z pulse line 222 to the coil portion 220 of the pointer 210. As a result of the electrical pulse provided in the coil 220, a strain wave is propagated along the magnetostrictive wire 214 located along the central axis of the shaft 212. The strain wave will travel from its point of induction into the wire; at the point corresponding to the height of the pointer 210 above the surface of the data sheet 202. The magnetostrictive pulse will travel at the speed of sound through metal, as was described above. At the base of the shaft 212 is a pickup coil 216 which responds to the magnetostrictively induced strain wave propagating along the line 214 for transducing therefrom an electrical pulse along the exit line 218.

For providing more accurate data positioning, the base of the pointer mechanism 208 is provided with a first pickup coil 224 and a second pickup coil 226. The first pickup coil 224 results in a first X and Y coordinate location, whereas, the pickup coil 226 will result in a second X and Y coordinate location. The first X and Y coordinate location is indicated by means of an X-1 stop, Y-1 stop, while the second coordinated location is indicated by means of the X-2 stop, Y-2 stop.

Magnetostrictive wire such as is described above is more fully described in such use in copending application Ser. No. 312,547, filed Dec. 6, 1972, the disclosure of which is incorporated herein by reference. Such wire is available from nickel chromium vanadium manufactured by the Wilbur Driver Manufacturing Company of New Jersey, or an alloy known as Permendur, manufactured by the Allegheny Ludlum Corporation of Pittsburgh, Pa.

Figure 8:
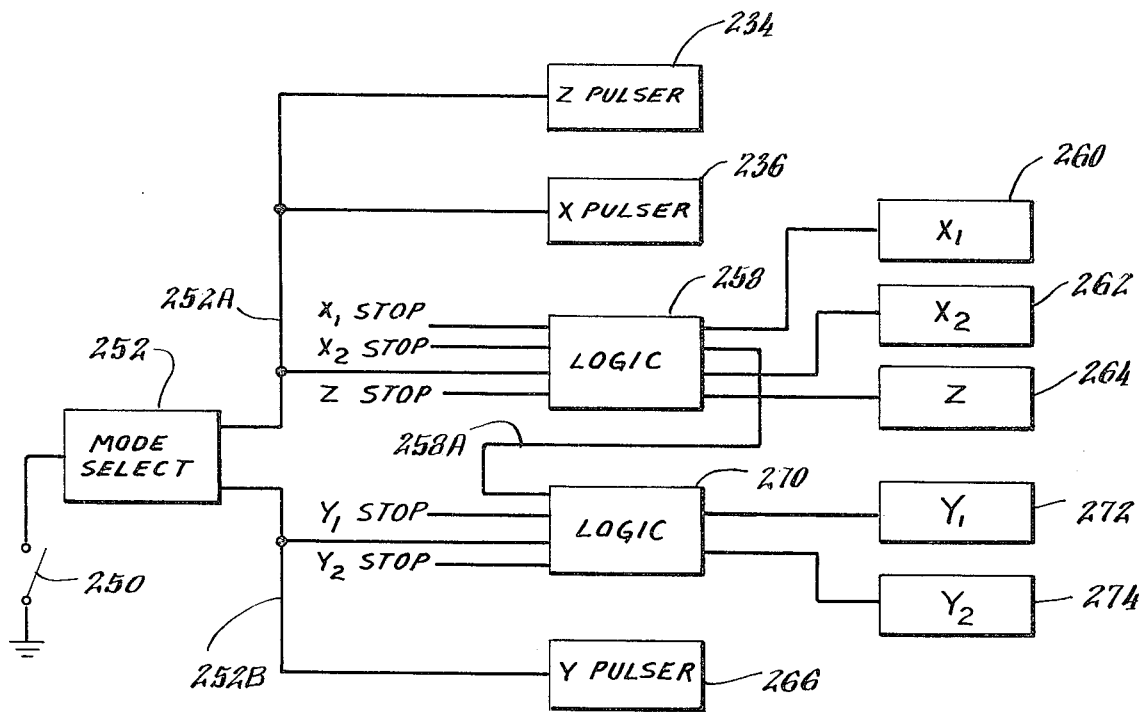
FIG. 8 is a circuit diagram illustrating the operations of the schematic diagram of FIG. 7.

Referring now to FIG. 8, a logic circuit for accomplishing the foregoing three-dimensional digitization is illustrated. The logic circuit operates in a manner similar to that described in conjunction with the two-dimensional embodiment illustrated above. A switch 250 is provided for activation and may be located physically in proximity with the unit 208 illustrated in FIG. 7. A mode select unit 252 operates to channel the energy in accordance with a desired sequence, necessitated by avoidance of digitizing conflict. The digitization is of a nature such that only the X and Y coordinate digitizations will conflict, thus providing a simultaneous operation with regard to X and Z or Y and Z digitizing.

Thus, as shown in FIG. 8, the mode selection unit or circuit 252, upon activation through the switch 250, will provide a signal first to the upper half of the logic circuit portion consisting of a Z pulser 234, the X pulser 236, and the logic circuit 258. Appearance of the signal along the output line 252A of the mode select circuit 252 applies an activation signal to the Z pulser 234, the X pulser 236 and energizes the logic 258 to begin the digitizations of the counters corresponding to coordinate positions X1, X2 and Z, or counters 260, 262, and 264 respectively. Provisions for margin sequencing may be made in accordance with the circuit described above in connection with FIG. 5. Activation of the X and Z pulses will provide the longitudinal line wave along the surface of the sheet 202 from the X pulser line 204, and will provide an activation signal on line 222 to the magnetostrictive wire 214 positioned in the Z axis shaft 212. When the X1 stop pulse is received by the logic 258, the counter 260 will shut down. When the X2 stop pulse is received by the logic 258, the counter 262 will shut down. When the Z stop pulse is received by the logic 258, the counter 264 will shut down. Thus, counters 260, 262 and 264 will provide digitizations of the X1 position, X2 position and Z position. Upon completion of the X1 stop, X2 stop and Z stop, an appropriate logic signal is provided along the line 258A in conjunction with the mode selection operation of the mode selection circuit 252 which will then supply appropriate energization along the line 252B to a Y pulser network 266 and to the logic unit 270. Provision of the logic signal to the logic circuit 270 will activate the Y1 position and Y2 position counters 272 and 274 respectively. Upon receipt of the Y1 stop pulse, the Y1 digitization counter 272 will stop and, upon receipt of the Y2 stop pulse, the logic 270 will serve to close down the operation of the Y2 counter 274. Logic 258 and 270 may then provide appropriate transfer signals for translating the X1, X2, Z, Y1 and Y2 data to appropriate usage. An external control may be preset in accordance with the X1, X2, Y1 and Y2 positions to provide a single point along the XY plane corresponding to the central position of the data shaft 212 on the XY surface, whereas the Z position will provide an accurate indication of height. Alternatively, the X1, Y1, and X2, Y2, positions may be employed to sense the direction of the pointer in terms of polar coordinates thereby providing an additional dimension of digital data for use by an external utilization device. Thus, the use of magnetostriction has been shown to provide a method whereby three-dimensional data points of X, Y and Z coordinates may be obtained.

Obviously, other combinations of magnetostrictive sheets and wires may be employed to effect measurements along multiple planes or points and in various forms and configurations.

For example, three dimensional digitizing may be accomplished with the structure 208 cooperating with any two dimensional digitizing surfaces, such as the wire array disclosed in the aforementioned copending application Ser. No. 312,547 and incorporated by reference herein.

Other configurations, as well as modifications, alternatives, omissions, refinements and substitutions will be apparent to those skilled in the art, as within the inventive scope, and although certain embodiments and descriptions have been provided, it is to be understood that various further configurations, modifications, alternatives, omissions, refinements and substitutions which depart from the disclosed exemplary embodiments may be adopted without departing from the spirit and scope of the invention.

What is claimed is:

1. A position determination device comprising a data surface, non-directional magnetostrictive media positioned proximate said data surface, first conductor means located at an edge of said transmission media for magnetostrictively inducing a simultaneous unitary longitudinal strain wave across said edge in a propagating direction perpendicular to said edge, second means positioned proximate said data surface and responsive to said propagating wave for providing an electrical signal, and third means for digitizing the time delay from propagation to provision of said electrical signal.

2. The combination of claim 1 wherein said non directional media is a planar magnetostrictive sheet.

3. The combination of claim 1 wherein said first conductor means includes a line field generating device positioned at said edge.

4. The combination of claim 1 wherein said second means includes a torodial coil of electrical wire responsive to the variation in permeability resulting from the passage of said strain wave in proximity thereto.

5. A position determination device comprising a data surface, a non-directional planar magnetostrictive sheet positioned proximate said data surface, a first line field generating device positioned along one coordinate of said planar magnetostrictive sheet, a second line field generating device positioned along a second coordinate of said planar magnetostrictive sheet, said first and second line field generating devices comprising conductors positioned adjacent said one and second coordinates of said planar magnetostrictive sheet, means for supplying field pulses to said first and second lines, said field pulses inducing a simultaneous unitary longitudinal strain wave across said device and propagating perpendicularly with respect thereto, pick up means positioned proximate said sheet at a positioned location, means responsive to the variation in permeability in said sheet wave for providing an electrical pulse from said pick up means, means responsive to propagation of said strain wave from each coordinate to initiate a digitization, and means responsive to each respective electrical pulse for ceasing the digitization associated with each said respective propagation strain wave, thereby digitizing the respective coordinate position of said pick up means relative to said line field generating devices.

6. The combination of claim 5 wherein each line field generating device is an electrical conductor positioned adjacent said sheet.

7. The combination of claim 5 wherein each line field generating device is an electrical conductor positioned adjacent a permanent magnet and proximate said sheet.

8. The combination of claim 5 wherein said means for supplying field pulses includes logic means for sequentially applying said field pulses first to one of said coordinates, and including means responsive to the electrical pulse corresponding to pick up of the strain wave associated with said first coordinate for triggering the field pulse for the next coordinate.

9. The combination of claim 8 wherein said logic means includes delay means for delaying said triggered field pulse by a time period sufficient to allow strain wave reflections of said first coordinate strain wave to substantially diminish.

10. The combination of claim 8 wherein said logic means includes margin sequencing means for blocking said digitization after production of said field generating pulse by a period of time sufficient to correspond to a margin.

11. The combination of claim 8 wherein said logic means includes means responsive to completion of digitization in each coordinate for providing a data ready signal, and means responsive to an overflow condition in any coordinate digitization to block said entry ready signal.

12. A position determination device comprising a magnetostrictive data surface, a first field generating device positioned along one coordinate of said surface, a second field generating device positioned along a second coordinate of said surface, a magnetostrictive wire element positioned along a third coordinate, said first, second and third coordinates together defining a three dimensional data volume, pick up means movably positioned about said surface for defining a position to be determined, a third field generating device adjustably positioned above said pick up means along said magnetostrictive wire, means for supplying field pulses to each of said first, second and third field generating devices for inducing propagating strain waves and initiating a digitization corresponding to each of said coordinates, first means coupled to said pick up means and responsive to detection of the first coordinate strain wave for ceasing said first coordinate digitization, second means coupled to said pick up means and responsive to detection of the second coordinate strain wave for ceasing said second coordinate digitization, and third means coupled to said pick up means and responsive to detection of the third coordinate strain wave for ceasing said third coordinate digitization.

13. The combination of claim 12 further including means for applying said first and third field pulses simultaneously, and said second field pulse after cessation of said first coordinate digitization.

14. The combination of claim 12 wherein said pick up means includes first and second pick up detectors for providing two first coordinate digitization points and two second coordinate digitization points.

* * * * *